United States Patent
Rinne et al.

(10) Patent No.: US 9,300,812 B2
(45) Date of Patent: Mar. 29, 2016

(54) METHOD AND APPARATUS FOR SPECTRUM USE

(75) Inventors: Mika Rinne, Espoo (FI); Mikko Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/111,510

(22) PCT Filed: Apr. 15, 2011

(86) PCT No.: PCT/FI2011/050340
§ 371 (c)(1),
(2), (4) Date: Oct. 11, 2013

(87) PCT Pub. No.: WO2012/140311
PCT Pub. Date: Oct. 18, 2012

(65) Prior Publication Data
US 2014/0038552 A1 Feb. 6, 2014

(51) Int. Cl.
*H04M 15/00* (2006.01)
*H04W 16/14* (2009.01)
*H04W 24/08* (2009.01)
(Continued)

(52) U.S. Cl.
CPC ............. *H04M 15/60* (2013.01); *H04L 12/145* (2013.01); *H04L 41/0896* (2013.01); *H04L 41/5029* (2013.01); *H04W 4/24* (2013.01); *H04L 12/1435* (2013.01); *H04M 15/54* (2013.01)

(58) Field of Classification Search
CPC ..... H04L 12/14; H04L 12/24; H04L 12/1428; H04L 41/0896; H04L 12/1435; H04L 12/145; H04L 41/5029; H04W 16/14; H04W 4/24; H04W 15/00; H04W 12/04; H04W 24/08; H04W 28/16; H04W 72/04; H04W 72/0453; H04W 72/0486; H04W 72/0493; H04W 88/08; H04W 16/10; H04W 72/1257; H04W 74/002
USPC ................ 455/67.11, 422.1, 452.2, 406, 454; 370/338
See application file for complete search history.

(56) References Cited

U.S. PATENT DOCUMENTS

2002/0046037 A1 * 4/2002 Ausubel et al. .................... 705/1
2006/0160543 A1 * 7/2006 Mashinsky ................. 455/452.2
(Continued)

FOREIGN PATENT DOCUMENTS

| EP | 2257097 | * 12/2010 | ............ H04W 16/14 |
| WO | 03081842 | 10/2003 | |

(Continued)

OTHER PUBLICATIONS

International Search Report and Written Opinion received for corresponding Patent Cooperation Treaty Application No. PCT/FI2011/050340, dated Jan. 16, 2012, 13 pages.
(Continued)

*Primary Examiner* — Inder Mehra
(74) *Attorney, Agent, or Firm* — Seppo Laine Oy (57) ABSTRACT

In accordance with an example embodiment of the present invention, there is provided an apparatus for facilitating charging in cognitive radio systems. The apparatus is configured to receive a data structure comprising accounting information, to obtain price information relating to the accounting information and to derive charging information and to send the charging information to a network. In some embodiments the apparatus is further configured to derive a revenue distribution scheme.

21 Claims, 5 Drawing Sheets

(51) Int. Cl.
*H04L 12/24* (2006.01)
*H04W 4/24* (2009.01)
*H04L 12/14* (2006.01)

(56) References Cited

U.S. PATENT DOCUMENTS

| | | | |
|---|---|---|---|
| 2010/0145862 A1* | 6/2010 | Chang | 705/80 |
| 2011/0002314 A1* | 1/2011 | Choi et al. | 370/338 |
| 2011/0125905 A1* | 5/2011 | Baucke et al. | 709/226 |
| 2011/0237238 A1 | 9/2011 | Hassan et al. | |
| 2012/0238218 A1* | 9/2012 | Stine | 455/67.11 |
| 2015/0255073 A1* | 9/2015 | Gao | G01L 21/038 704/500 |

FOREIGN PATENT DOCUMENTS

| | | | | |
|---|---|---|---|---|
| WO | WO 03081842 | * | 10/2003 | H04L 12/14 |
| WO | 2010145094 | | 12/2010 | |
| WO | WO 2010145094 | * | 12/2010 | H04L 12/24 |

OTHER PUBLICATIONS

3GPP TS 32.298 V 10.4.0 (Mar. 2011). Technical Specification. 3rd Generation Partnership Project; Technical Specification Group Services and System Aspects; Telecommunication management; Charging management; Charging Data Record (CDR) parameter description. (release 10). [online] Retrieved from the Internet<http://www.3gpp.org/ftp/Specs/html-info/32298.htm>.

* cited by examiner

FIGURE 5

METHOD AND APPARATUS FOR SPECTRUM USE

RELATED APPLICATION

This application was originally filed as PCT Application No. PCT/FI2011/050340 filed Apr. 15, 2011.

TECHNICAL FIELD

The present application relates generally to optimizing signaling procedures and/or allocation of radio resources.

BACKGROUND

Radio frequencies form an electromagnetic spectrum which may be subdivided into spectrum bands. For a geographical area, regulatory authorities may define uses for different bands of spectrum. Certain sections of the spectrum may be reserved for air traffic communication, others for commercial radio channels, others for television broadcasts and yet others for cellular communication networks, for example.

As uses for spectrum have become varied, spectrum has become a scarce resource and it has become desirable to optimize use of spectrum. Allocating spectrum in a way that leaves a section dedicated for a certain use unused while other users suffer lack of spectrum is inefficient. For example, a spectrum band reserved for emergency communication may be used only intermittently while a spectrum band reserved for cellular communications may suffer multiple-user interference due to a high volume of data traffic in proportion to allocated spectrum.

Some communication devices are capable of using more than one spectrum band. For example certain cellular phones are configured to be capable of communicating using a first band and a first radio access technology, or alternatively a second band and a second radio access technology. Devices may select a less heavily loaded band to use. Multiband cellular devices are also capable of operating in different countries, where different spectrum bands are reserved for cellular use.

Cognitive radio is a technique wherein either a network or a wireless node changes its transmission or reception parameters, such as frequency band, to avoid interference caused from or to other users. Cognitive radios may be capable of sensing unused spectrum and taking advantage of it as long as it remains unused. Cognitive radios may be configured to detect that a user with higher access rights to the spectrum band becomes active, responsive to which the cognitive radio may leave the affected spectrum band to avoid causing interference to the user with higher access rights.

SUMMARY

Various aspects of examples of the invention are set out in the claims.

According to a first aspect of the present invention, there is provided an apparatus, comprising a receiver configured to receive a data structure comprising accounting information, at least one processor configured to obtain price information relating to the accounting information and to derive charging information, and a transmitter configured to send the charging information.

According to a second aspect of the present invention, there is provided a method comprising receiving a data structure comprising accounting information, obtaining, in at least one processor, price information relating to the accounting information and deriving charging information, and transmitting the charging information.

According to a third aspect of the present invention, there is provided an apparatus comprising at least one processor, at least one memory including computer program code, the at least one memory and the computer program code configured to, with the at least one processor, cause the apparatus to at least compile a subscriber-specific data structure comprising accounting information, and transmit the data structure to a further apparatus, wherein the accounting information comprises a plurality of spectrum use records.

According to a fourth aspect of the present invention, there is provided an apparatus comprising at least one processor and memory storing computer-executable instructions, the computer-executable instructions, together with the processor, configured to cause the apparatus at least to receive information describing a spectrum visit opportunity and to configure a radio transceiver of the apparatus to at least in part use the spectrum visit opportunity;

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
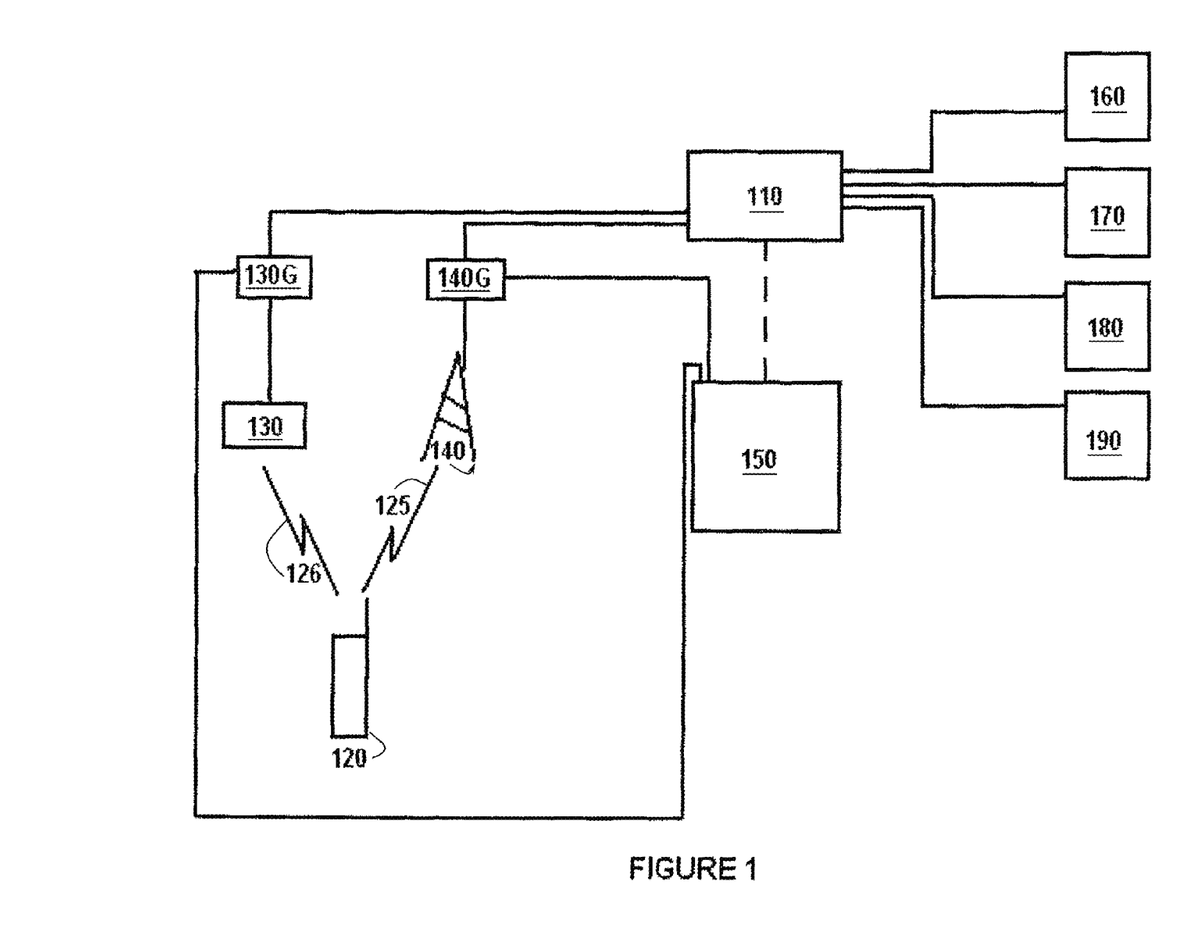
FIG. 1 illustrates an example of a system capable of supporting some embodiments of the invention.

FIG. 1 illustrates an example of a system capable of supporting some embodiments of the invention. FIG. 1 illustrates a mobile node, or mobile, 120, although the scope of the invention includes also embodiments where this node is not mobile. Mobile 120 is capable of communicating using more than one spectrum band. Mobile 120 may be configured to employ cognitive radio principles to determine spectrum resources that are usable at a given time, and to use those resources when communicating. Mobile 120 may be, for example, a mobile device or a mobile apparatus. Mobile 120 may be a user equipment, cellular phone, personal digital assistant, smartphone, laptop computer, music player, car computer or other device. In FIG. 1 it is illustrated that mobile 120 communicates with access point 130 using radio link 126. It is also illustrated that mobile 120 communicates with base station 140 using radio link 125.

Radio link 125 may conform to a cellular radio access technology such as GSM, WCDMA or LTE, for example. Radio link 125 may comprise an uplink for conveying information from mobile 120 to base station 140 and radio link 125 may comprise a downlink for conveying information from base station 140 to mobile 120. The uplink and downlink may be separated from each other such that they occupy different frequency bands, which is known as frequency division duplex communication. Alternatively or additionally the uplink and downlink may occupy the same frequency band and be separated from each other in the time domain, which is known as time division duplex communication. The frequency band or bands allocated to radio link 125 may change over time. The change over time may be dynamic.

Radio link 126 may conform to a cellular or a non-cellular technology. Examples of non-cellular technologies include wireless local area network, WLAN, and bluetooth technologies. Radio link 126 may also comprise an uplink and a downlink, which may occupy different frequency bands. The frequency bands may change dynamically, and the frequency bands may comprise frequency ranges in licensed and unlicensed bands.

Mobile 120 may be configured to use one, two or more than two radio links at the same time. Mobile 120 may be capable of utilizing more than two spectrum bands, and more than two radio access technologies. One radio link may use more than one spectrum band at the same time. Therefore two links are illustrated on FIG. 1 only as an example. Radio links may be based on time division multiple access, TDMA, code division multiple access, CDMA, frequency division multiple access, FDMA, or combinations of these, for example.

Mobile 120 may be configured to operate as a cognitive radio. Mobile 120 may be configured to sense unused spectrum bands and take advantage of them. Sensing may comprise detecting energy on frequencies. Mobile 120 may be configured to sense when users with higher access rights to the bands begin using the bands and to responsively cease taking advantage of the bands. Mobile 120 may be configured to receive indications of unused spectrum bands from a network node, such as for example a spectrum broker or a regulatory authority. The network node may provide information on free spectrum bands responsive to being made aware of a geographical location of mobile 120. Free spectrum bands may be defined as a function of location, since radio waves are attenuated over distance, with higher frequencies attenuating more rapidly than lower frequencies. Unlicensed bands may occupy higher frequency ranges, meaning that they may be unused locally and thus provide opportunities for mobile 120 to opportunistically use them. Also lower frequency ranges may contain bands that are unused locally, for example on a regional scale. Mobile 120 may inquire concerning unused spectrum bands by transmitting a request to the network node. The request may comprise indications of at least one of the location of mobile 120 and its capabilities. Alternatively a network may add at least one of indication of location and its capabilities to the request message before it reaches the network node.

Access point 130 is operably connected to gateway 130G. The connection may traverse intermediate nodes and may be effected over wire-line or wireless, such as microwave, links Likewise base station 140 is operably connected to gateway 140G. Gateways 130G and 140G are configured to compile spectrum use records concerning mobile 120. When mobile 120 makes use of a spectrum band with surplus capacity, a gateway compiles a spectrum use record comprising information on the use. A spectrum band may have surplus capacity locally, meaning that it has surplus capacity within a certain geographical area. For example, when mobile 120 operates under a cellular network and is camped under the cell of base station 140, its cognitive spectrum usage may be monitored by gateway 140G. Gateway 140G may advise mobile 120 on usable spectrum bands, or gateway 140G may observe messages from a network node to mobile 120 comprising information on usable spectrum bands. When mobile 120 makes use of spectrum bands, for example spectrum bands other than those explicitly allocated to base station 140, it may be configured to inform gateway 140G of this use. Similarly when mobile 120 operates under access point 130, gateway 130G may compile spectrum use records concerning mobile 120.

Gateways 130G and 140G are operably connected to server 110. Gateways 130G and 140G may be configured to send spectrum use records they have compiled to server 110. For example, gateways 130G and 140G may compile a data structure, such a data container, comprising a plurality of spectrum use records. Server 110 may be connected to a home operator of the subscriber of mobile 120, illustrated in the figure as 150. Server 110 may further be connected to at least one regulatory authority 160. Server 110 may further be connected to at least one broadcaster 170. Server 110 may further be connected to at least one media company 180. Server 110 may further be connected to at least one spectrum broker 190. Said authority, said broadcaster, said media company, and said spectrum broker are examples of parties that may hold rights to grant permission for use for a spectrum band or a part of it. These parties may regulate the spectrum, may own the spectrum or may be licensees of a spectrum portion. Gateways 130G and 140G may also be connected directly to home network 150.

At least one of at least one regulatory authority 160, at least one broadcaster 170, at least one media company 180 and at least one spectrum broker 190 may be singly or collectively known as "network node" for the sake of brevity. Therefore, in this sense network node may refer also to more than one node or to distributed nodes. This node may act like a server, a database, a web URL, a portal or other point of contact for that party. Server 110 may receive spectrum use offers from a network node, which may comprise information defining a spectrum band that may be used. These offers may be a response to a request by the server for a portion of a spectrum band, or these offers may be advertisements for spectrum availability, or these offers may be based on an auction, either initiated, or called, by server 110, or arranged by the offering party or an authority. In some embodiments, availability and price information have a local geographical scope. In some embodiments, availability and price information have a defined validity time. The spectrum use offers may also comprise information on a price that a spectrum owner wants to extract from users of mobile nodes 120 making use of the spectrum. Server 110 may pass the spectrum use offers on to gateways such as gateways 130G and 140G. This information for the spectrum availability, price and so on may be provided to gateways prior its actual use, or the use may happen first according to given constraints, with tracking of use and charging happening afterwards. Gateways 130G and 140G may advise mobile 120 of spectrum use opportunities that mobile 120 is capable of utilizing. The advice may be based at least in part on information comprised in spectrum use offers. Responsive to mobile 120 making use of such opportunities, gateways 130G and 140G may be configured to compile spectrum use records comprising information on the uses. Server 110 may transmit intermittent advice of charge messages toward mobiles 120 informing mobiles 120 concerning how much use of the spectrum bands has cost so far. This report may be positive in nature stating the cost saving of using spectrum cognitively, or it may be triggered based on certain thresholds set for cognitive use of spectrum, or it may be periodic as a fraction of the actual invoicing period.

A gateway or server 110 may provide a query to its client mobile 120, requesting an acknowledgement of a spectrum cost. The user by responding to the query, for example by clicking an icon, and accepting the costs gets invoiced of the use of spectrum either by its operator's invoice or by a credit card, if the user has so preferred. This query can represent the cumulative costs of spectrum visits and the user may accept the costs at his convenience or at the latest, when the due date of payment expires. This way, the payment of the spectrum use would be very similar and as easy as buying a service from an online store.

Server 110 may be configured to receive from gateways such as gateways 130G and 140G data structures, for example data containers comprising accounting information. Server 110 may react to receiving the data structures by obtaining price information relating to the accounting information, which means that server 110 associates prices to items comprised in the accounting information. By associating prices to items in the accounting information server 110 may derive charging information that is usable in charging subscribers. The derived charging information may be transmitted from server 110 to an operator of network, such as for example a home network of a subscriber, so that the operator of the home network may invoice subscribers based on the charging information. Alternatively server 110 may be configured to provide the charging information to an invoicing entity within the network where server 110 is comprised. Server 110 may overall provide a charging service for cognitive usage of spectrum by mobiles 120. Server 110 may also provide charging server functionality to an authority, owner or licensee of spectrum. Server 110 may also add cost elements for the charging service as such.

The data structures received in server 110 from gateways may be subscriber-specific, meaning that the gateways may have compiled accounting information specific to a subscriber for inclusion in one data structure. The accounting information may be compiled in the home network, at a serving gateway. The accounting information may be compiled in the visited network, at the serving gateway, respectively. For example, where a gateway is a gateway of a visited network for a subscriber, the gateway may compile accounting information concerning a subscriber over the duration of the entire visit and transmit it in one data structure. A data structure may therefore comprise accounting information that relates to behaviour of a mobile 120 over a period of time, and may comprise information relating to usage of a plurality of spectral bands. The data structures may comprise an identification of at least one of the network where the gateway sending the structure is comprised and a home network of the subscriber whom the data structure is associated with.

The data structure may comprise at least one spectrum use record. A spectrum use record may indicate a usage of a spectrum band by mobile 120. The spectrum band or bands may lie outside bands allocated to a network in which the respective gateway is comprised. The data structure may comprise more than one spectrum use record, providing for efficient signaling between the gateway and server 110.

A spectrum use record may comprise an identification of at least one of a spectrum band, a portion of a spectrum band and a set of spectrum portions, which may be expressed in terms of at least one of a frequency, a bandwidth and a frequency channel number. The identification of a spectrum band may be encoded according to an appropriate scheme, for example in some communication systems there exist mappings of frequency channel number to physical frequency, or to a range of frequencies, and/or a bandwidth. The spectrum use records may also comprise an indication of an owner or a licensee of the spectrum band. The spectrum use records may also comprise indications of at least one of extent of use and a location of usage. The location of usage may be expressed in terms of a cell or access point under which the use occurred, or a location expressed in terms of a city, region or country. Alternatively or additionally, geographical coordinates may be employed. A spectrum use record may comprise an indication that specifies that the use occurred responsive to a specific spectrum use offer received from a network node. A spectrum use offer may be received in server 110 from a network node for forwarding or broadcasting to mobiles 120 in a certain area. The spectrum use offer may identify a spectrum band that is available for opportunistic use, a time interval when the offer is valid and/or pricing information identifying how much it would cost mobile 120 to take up the offer. The pricing information comprised in the spectrum use offer may comprise different prices or pricing policies for different time instances within the validity period of the offer, and different prices for different types of data. Spectrum use offers may also be routed to mobiles 120 and/or gateways and/or operator's radio networks without sending them via server 110. A benefit from the offers is that mobile access to spectrum is facilitated, which makes cognitive radio more efficient.

The indication of extent of use may comprise an indication as to for how long mobile 120 has used the spectrum band. The indication of extent of use may comprise an indication as to a quantity of data received and/or transmitted using the spectrum band. The indication of extent of use may comprise an indication as to the type of data communicated using the spectrum band. Types of data may include quality of service classes such as conversational, streaming, interactive or background/non-urgent. The extent of use may also comprise an indication as to at what time of day the use occurred.

Server 110 may obtain price information by consulting a database, a charging policy server or information provider. A network node may have furnished server 110 with price information in the past, or server 110 may responsive to receiving accounting information query for price information. For example, where server 110 receives a spectrum use record for which it doesn't have price information in an internal database, it may query a network node for the price information. Where the spectrum use record comprises an identity of an owner of the spectrum band concerned, server 110 may query the identified spectrum owner for price information. A spectrum use record may also indicate that a spectrum broker 190 manages the spectrum band concerned, in which case server 110 may be configured to consult spectrum broker 190 for price information. Price information can also be based on auctions. Server 110 may also be configured to act on an indication of spectrum band comprised in a spectrum use record. Server 110 may query regulatory authority 160 for information on what instance is responsible for the spectrum band, and responsive to receiving a response query a responsible instance identified in the response for pricing information. The responsible instance may be a spectrum owner or spectrum broker, for example.

In cases where server 110 has forwarded toward gateways spectrum use offers it has received from a network node, server 110 may be configured to observe price information comprised in the offers and store it in a database. When server 110 subsequently receives spectrum use records relating to the offer, the spectrum use records may comprise information associating the actual use with the offer, which allows server 110 to obtain corresponding price information from the database. In some embodiments, the spectrum use records themselves comprise price information. In some embodiments of the invention spectrum use offers are not used and mobiles 120 sense free spectrum autonomously.

Using price information associated with accounting information such as spectrum use records, server 110 may be configured to derive a revenue distribution scheme for the spectrum uses described in the received data structure. Deriving a revenue distribution scheme may comprise determining revenue shares for each spectrum owner, licensee or broker. Deriving a revenue distribution scheme may comprise that server 110 participates in or facilitates arranging an auction to determine prices. An action may comprise communicating among at least one of a spectrum owner, a spectrum licensee, a regulatory authority, a spectrum broker, server 110 and a serving operator to determine pricing. On the principle that spectrum owners rent excess capacity to mobiles 120 operating under cognitive radio principles, the owners should receive compensation for each use of spectrum they control.

Using the revenue distribution scheme, server 110 may be configured to cause revenue to be distributed to respective owners, licensee and/or spectrum brokers. This may occur on a credit basis so that server first finances the expenses of the use of spectrum and may later request and receive the expenses and planned revenue from the operators under which mobiles 120 are subscribed. Invoicing may then happen via the home operator of the subscriber.

Server 110 may receive data structures from gateways, such as serving gateways, from mobile operators, virtual operators, visited networks, spectrum licensees, regulatory authorities and/or spectrum brokers. In the case of spectrum licensees the data structures may be a way to charge for spectrum use by the licensee or his customers in accordance with a licensing agreement. In the case of regulatory authorities the data structures may perform a role of accounting and keeping track of how much spectrum each authority uses to enable managing spectrum resources allocated to public use. For example, if it is discovered that an authority is using an unjustifiably large part of spectrum resources, for example ranked by traffic priority, the communication solutions of that authority may be adapted to consume less resources. For example, server 110 may transmit an instruction message to a gateway of the authority instructing some or all of mobiles 120 to switch to a lower rate codec or lower rate services which will use less spectrum resources. This way, spectrum resources can be allocated according to defined priorities.

Figure 3:
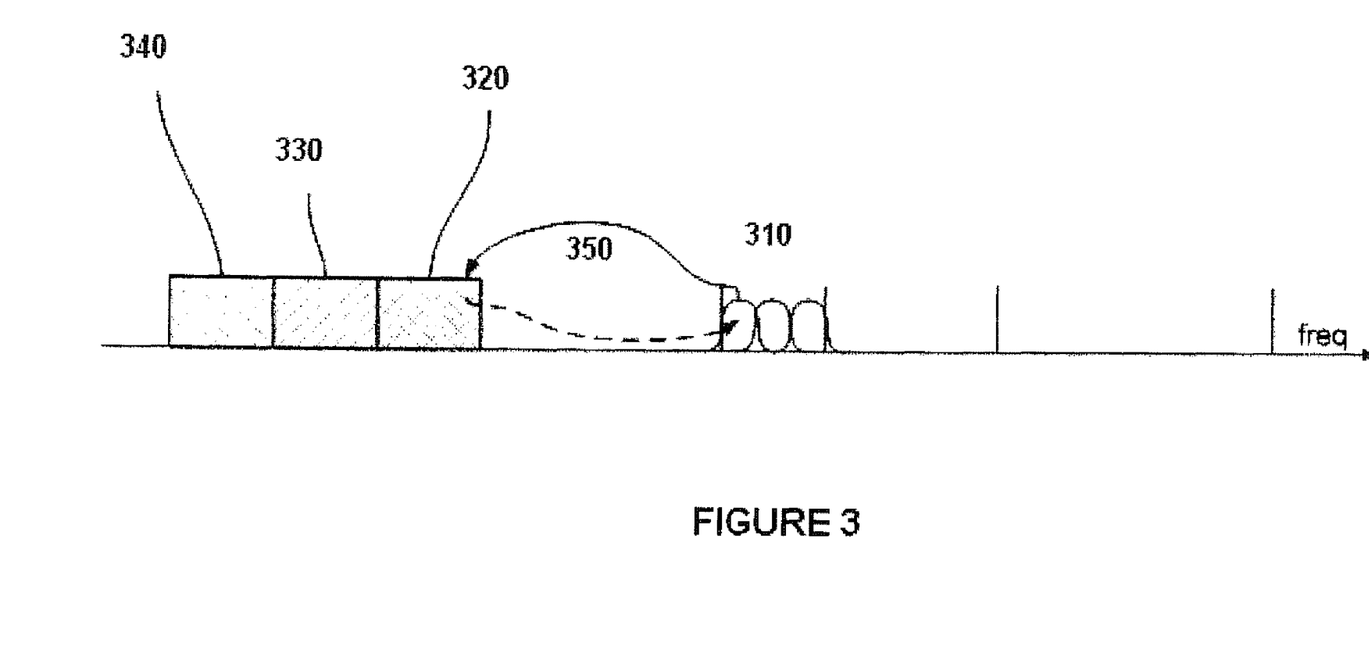
FIG. 3 illustrates an example spectrum range.

FIG. 3 illustrates an example spectrum range, where frequency increases from left to right. In this example, spectrum band 310 corresponds to a band, where frequencies are licensed to cellular use. Within band 310 are illustrated three carriers. Without cognitive radio principles, mobiles 120 under the cellular system to which spectrum band 310 is allocated are restricted to spectrum resources within this band. However using cognitive radio principles, mobiles 120 may sense or be advised that spectrum band 320 isn't in use, or is in use only to such an extent that mobile 120 might use it as well. Mobile 120 may be so advised, for example, by receiving a spectrum use offer from server 110 or from the owner or licensee of spectrum band 320. Alternatively, the mobile may be configured to operate on band 320 by the serving network, which may be aware of the spectrum availability and allocate the communication resources for the mobile into that band. In this example, spectrum bands 320, 330 and 340 may have different owners or licensees, for example media companies such as the Finnish National Broadcasting Company, other media companies and telecom operators. To make use of spectrum band 320, mobile 120 may conduct a spectrum visit 350 to spectrum band 320. Mobile 120 may be configured to do this, for example, responsive to determining that it has a large data file to transfer, and the transfer would complete sooner using spectrum band 320 in addition or alternatively to spectrum resources in spectrum band 310. Other reasons for such a spectrum visit may be heavy data flows, for example associated with transmitting video, or a local scope of the transfer, so that a data storage such as a media server is nearby, or cost efficiency where visited spectrum is cheaper to use. Mobile 120 may therefore also consider the cost of the spectrum visit prior to deciding to embark on the spectrum visit if mobile 120 has price information relating to spectrum band 320. Alternatively, the network may allocate resources on the visited spectrum for the mutual cost-per-bit benefit of the mobile user and the network. In this example, when mobile 120 concludes spectrum visit 350, it returns to spectrum band 310.

Table 1 describes an example data structure received in server 110 from a gateway. Each row corresponds to a spectrum use record. In the left-hand-side, or first, column is time information detailing when the spectrum use occurred. The second column from the left describes the duration of the spectrum use. The third column described a volume of data transferred, or alternatively a width of spectrum band used. The fourth column identifies a spectrum owner. The second column comprises duration of use in time or in tokens. When tokens are used, the definitions and number of tokens may be set in a spectrum use offer. A gateway, for example, may allocate tokens to mobiles 120 to allow spectrum visits in a controlled manner. The spectrum owner or licensee controls the overall presence and duration of presence of cognitive radios in his spectrum band by setting the number and definition of the tokens in a spectrum use offer he creates. A gateway, for example, may allocate the tokens between mobiles 120 in its domain according to a priority scheme of the network in which the gateway is comprised. The tokens may be prepaid or may be invoiced after the use.

TABLE 1

An example of a charging container of a subscriber in the Serving GW

Frequency band
frequency channel number/carrier frequency

| Event<br>[date &time] | time units of use<br>[hour:min:sec]<br>or [tokens] | Data amount<br>[MByte]<br>or [MHz] | Owner<br>Regulator/<br>company |
|---|---|---|---|
| ... | | | |
| 5.1.2011 21:30 | 35:00 | 2,600 MB | Ficora |
| 3.2.2011 18:00 | 10:00 | 37,500 MB | Ficora |
| 6.2.2011 14:00 | 1:25:15 | 20 + 20 MHz | ISM |
| 7.2.2011 00:30 | 50:00 | 56,000 MB | YLE |
| ... | | | |

Figure 4:
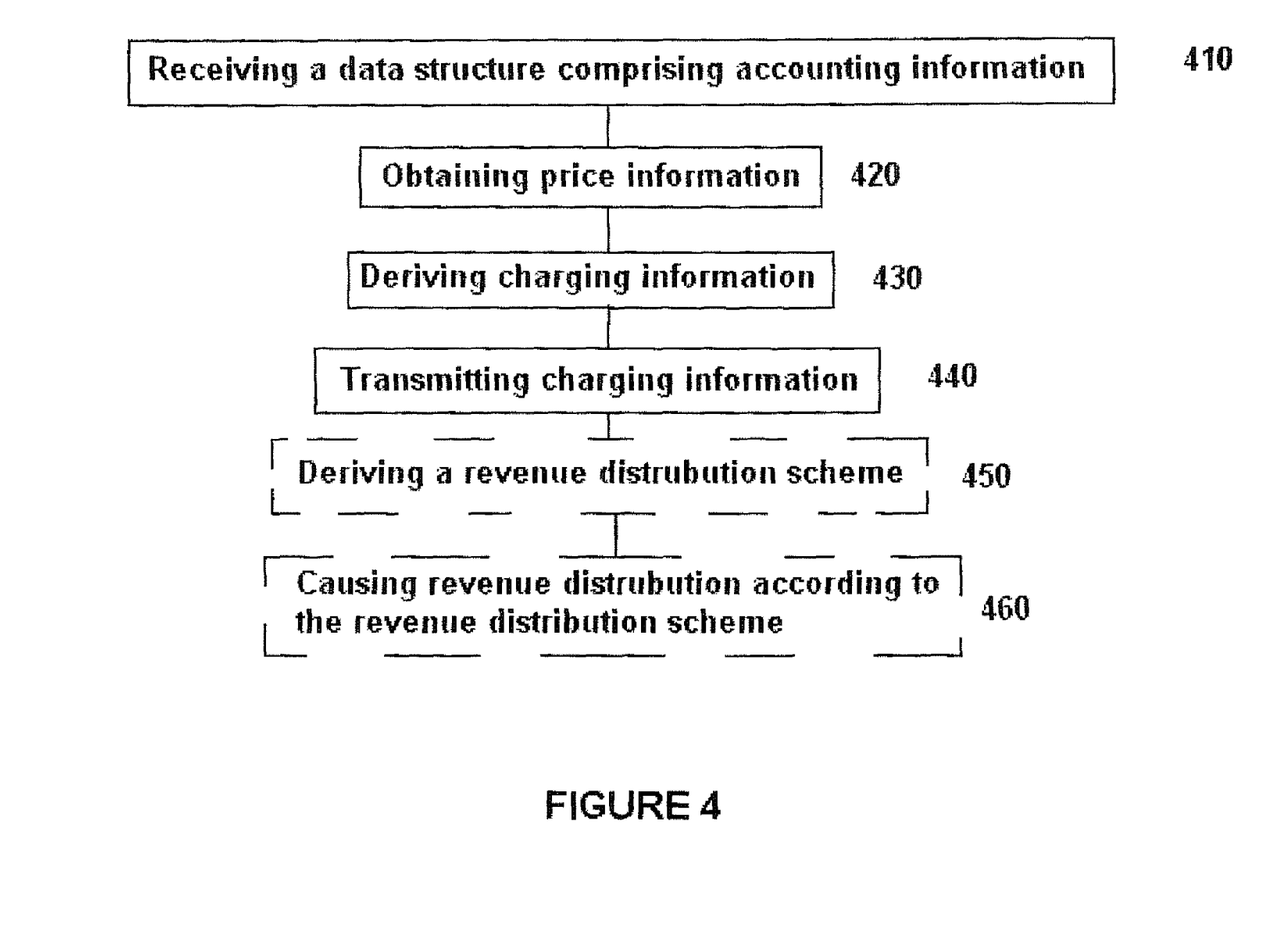
FIG. 4 is a flowchart of an example process according to some embodiments of the invention.

FIG. 4 is a flowchart of an example process according to some embodiments of the invention. In phase 410 a data structure is received, for example in server 110, comprising accounting information. The accounting information may comprise at least one spectrum use record. In phase 420, price information relating to the accounting information is obtained, for example as described above. For determining the price information, accounting information, charging policy and unit price may be used. In phase 430, charging information is derived based on the accounting information and the price information. In phase 440, the charging information is transmitted, or caused to be transmitted. The charging information may be transmitted from server 110 to home network 150, for example. In optional phase 450 a revenue distribution scheme is derived based on the accounting information and the price information. In optional phase 460, revenue is caused to be distributed in accordance with the derived revenue distribution scheme. All phases illustrated may take place in server 110, or alternatively the functionality may be distributed between distinct units that are arranged to communicate with each other. In one embodiment, phases 410, 420, 430 and 440 take place in server 110 and phases 450 and 460 take place in a separate unit capable of initiating monetary transactions, such as invoicing. In communications in FIG. 4, all transmissions may make use of encryption to improve security and privacy of subscribers. Alternatively, some transmissions may be secured and others not secured.

Table 2 describes an example of how spectrum use can be summed for each spectrum owner or licensee over all subscribers over several gateways over a period of time. Starting from the left-hand-side, the first column identifies a spectrum owner or licensee, the second column comprises an indication as to frequency resources involved, the third column comprises an indication as to an extent of use, terabyte as an example, the fourth column an indication of the total cost and the last column indicates the time period.

TABLE 2

An example of a cost of using spectrum, summed over all users over a billing period

| Owner | Frequency | Σ use | Expense | Time |
|---|---|---|---|---|
| Ficora | #23 | 500 TB | 40,000€ | 1.1.-28.2. |
| Ficora | #52 | 1700 TB | 70,000€ | 1.1.-28.2. |
| YLE | 1080.5 MHz | 300 TB | 50,000€ | 1.1.-28.2. |

Table 3 described an example of a section of a subscriber invoice concerning cognitive radio usage, such as for example an invoice of a user of mobile 120. The table includes, starting from the left, a timestamp associated with each spectrum visit, indications as to extent of use in terms of time and data volume, a cost, and an identification of spectrum broker, owner or licensee.

TABLE 3

An example of an excerpt of a subscriber invoice displaying costs incurred from spectrum visits

| Event [date &time] | time units of use | Amount | Expense | invoice |
|---|---|---|---|---|
| 5.1.2011 21:30 | 35:00 | 2,600 MB | 1.40€ | Ficora |
| 7.2.2011 00:30 | 50:00 | 56,000 MB | 0.50€ | YLE |

Figure 5:
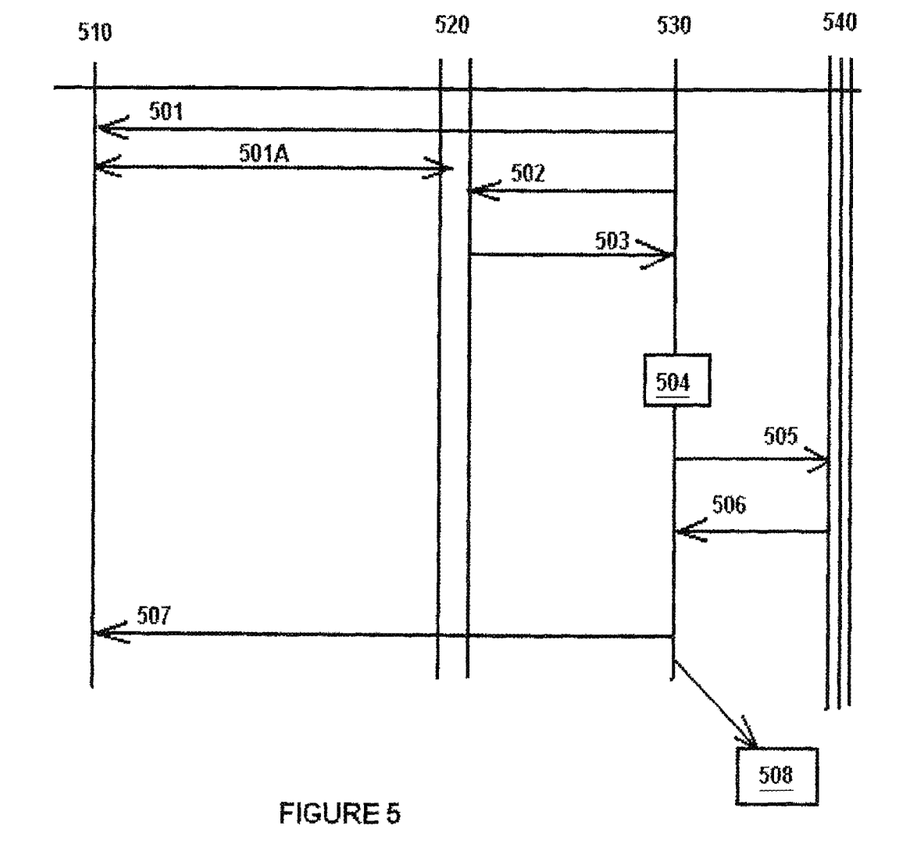
FIG. 5 is a flowchart of an example process according to an embodiment of the invention.

FIG. 5 is a flowchart of an example process according to an embodiment of the invention. Element 510 corresponds to mobile 120, elements 520 to gateways such as 130G and 140G, element 530 to an element such as server 110 and elements 540 to network nodes as described above. Mobile 510 may be configured to communicate via gateways 520 with other mobiles or with other network resources such as servers, URLs, databases, services and applications.

In phase 501, server 530 may be configured to inform mobile 510 of a spectrum visit opportunity. In an alternative embodiment, the radio access network including base stations may be informed of a spectrum visit opportunity. In this case, the radio access network may arrange the spectrum visit for mobile 510. Also both the radio access network and mobile 510 may be informed of a spectrum visit opportunity. The informing may take place via gateways 520 or via another route or routes. In phase 501A at least one spectrum visit occurs and mobile 510 communicates using a spectrum band, for example one identified in phase 501. The visit may occur under the guidance of a gateway 520. Gateway 520 records accounting information concerning the spectrum visit to a data structure. In optional phase 502, server 530 may be configured to request accounting information and in phase 503 server 530 may be configured to receive accounting information in a data structure from at least one gateway 520. When server 530 doesn't explicitly request accounting information, it may receive it unsolicited. In phase 504 server 530 may be configured to collect data structures, such as containers, comprising accounting information and to arrange spectrum charging based at least in part on the received accounting information. In phase 505 server 503 may be configured to request price information from at least one network node, and in phase 506 server 530 may be configured to responsively receive the requested price information. The accounting and pricing information may be used to derive charging information. In optional phase 507 server 530 is configured to advise mobile 510 of costs incurred from at least one spectrum visit. In phase 508 server 530 may be configured to transmit charging information. Charging information may be delivered for a party for invoicing the subscriber.

In an alternative embodiment, the process is initiated by the mobile 510 recognizing usable spectrum without signaling 501. In this case, the mobile may get permission to operate on visited spectrum from server 530 or from the gateways 520 or from the radio access network. The permission to use visited spectrum may be apriori known to the serving network, e.g. by a visit of database prior the actual use of the spectrum by mobile 510. Once using the visited spectrum, the mobile accounting at the gateways 520 will establish the spectrum use records according to the invention. The mobile may indicate need of such spectrum use records along communication 501A or related signaling, or the gateways 520 may establish the accounting records at its own initiative based on its knowledge of mobile's 510 spectrum visit.

Figure 2:
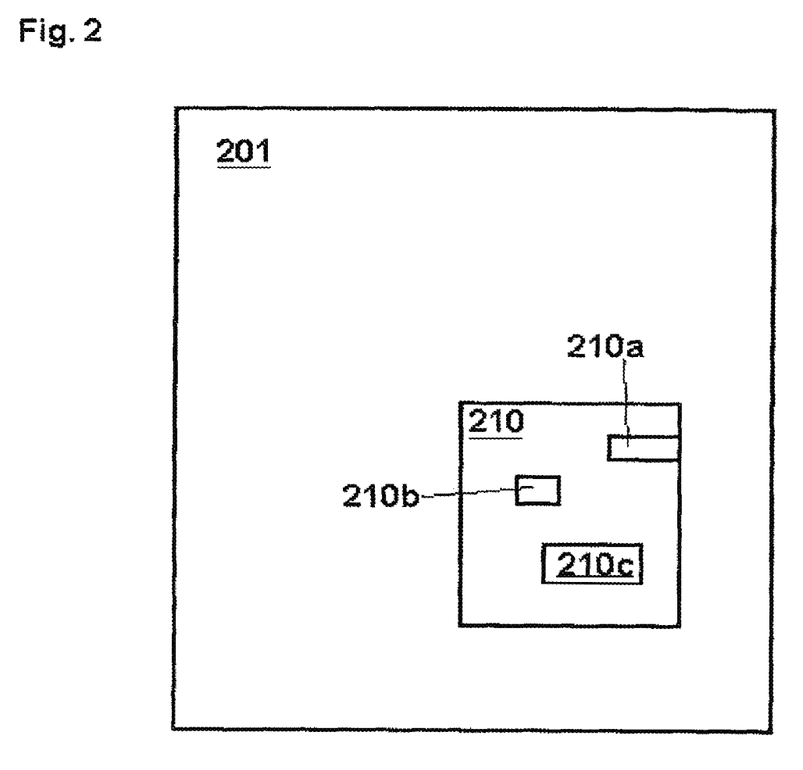
FIG. 2 illustrates an example apparatus 201 capable of supporting embodiments of the present invention.

FIG. 2 illustrates an example apparatus 201 capable of supporting embodiments of the present invention. The apparatus may correspond to server 110, for example. The apparatus is a physically tangible object, for example a server apparatus, mobile telephone, personal digital assistant, data dongle or a similar device. The apparatus may comprise a control apparatus 210, for example a digital signal processor, DSP, processor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example price information. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as software, hardware or a combination of software and hardware. The logic circuitry may comprise at least one processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210.

Without in any way limiting the scope, interpretation, or application of the claims appearing below, a technical effect of one or more of the example embodiments disclosed herein is that signaling related to charging is optimized and simplified, as a plurality of uses of a subscriber may be charged based on information contained in one data structure. Another technical effect of one or more of the example embodiments disclosed herein is that spectrum resources can be allocated according to defined priorities. Another technical effect of one or more of the example embodiments disclosed herein is that mobile access to spectrum is facilitated, making cognitive radio and use of spectrum more efficient. Needs for roaming agreements for spectrum visits are reduced by implementing charging via a server.

Embodiments of the present invention may be implemented in software, hardware, application logic or a combination of software, hardware and application logic. The software, application logic and/or hardware may reside on memory 210b or control apparatus 210. If desired, part of the software, application logic and/or hardware may reside on memory internal to the control apparatus, and part of the software, application logic and/or hardware may reside on memory external to the control apparatus. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a receiver configured to receive a data structure having accounting information, wherein the accounting information includes a plurality of spectrum use records, each of the spectrum use records including an identification of a spectrum band;
   at least one processor configured to obtain price information based at least in part on the identification of spectrum band of the accounting information and to derive charging information; and
   a transmitter configured to send the charging information.

2. An apparatus according to claim 1, wherein the data structure is subscriber-specific.

3. An apparatus according to claim 1, wherein a spectrum use record includes an indication of at least one of a frequency, a bandwidth, a frequency channel number, spectrum owner, a spectrum use offer, an indication of extent of use and a location of spectrum usage.

4. An apparatus according to claim 3, wherein the indication of extent of use includes at least one of an indication of time duration of use, an indication of quantity of transferred data and a type of transferred data.

5. An apparatus according to claim 1, wherein the at least one processor is configured to consult at least one internal database or at least one external data source in connection with obtaining the price information.

6. An apparatus according to claim 5, wherein the pricing information is received from at least one of a spectrum owner, a spectrum licensee, a regulatory authority, a spectrum broker and a serving operator.

7. An apparatus according to claim 1, wherein the at least one processor is further configured to derive a revenue distribution scheme.

8. An apparatus according to claim 7, wherein the at least one processor is further configured to cause revenue to be distributed to spectrum owners based on the revenue distribution scheme.

9. An apparatus according to claim 7, wherein the at least one processor is further configured to cause revenue defined by at least one auction or by the price information to be obtained from spectrum owners.

10. An apparatus according to claim 1, wherein the data structure is received from a serving gateway of at least one of a mobile operator, a virtual operator, a visited operator, a spectrum licensee, a regulatory authority or a spectrum broker.

11. A method, comprising:
    receiving a data structure having accounting information, wherein the accounting information includes a plurality of spectrum use records, each of the spectrum use records including an identification of a spectrum band;
    obtaining, in at least one processor, price information relating to the accounting information and deriving charging information; and
    transmitting the charging information.

12. A method according to claim 11, wherein the data structure is subscriber-specific.

13. A method according to claim 11, wherein a spectrum use record includes an indication of at least one of a frequency, a bandwidth, a frequency channel number, spectrum owner, a spectrum use offer, an indication of extent of use and a location of spectrum usage.

14. A method according to claim 13, wherein the indication of extent of use includes at least one of an indication of time duration of use and an indication of quantity of transferred data.

15. A method according to claim 11, further comprising deriving a revenue distribution scheme.

16. A method according to claim 15, further comprising causing revenue to be distributed to spectrum owners based on the revenue distribution scheme.

17. An apparatus, comprising:
   at least one processor; and
   at least one memory including computer program code,
   the at least one memory and the computer program code configured to, with the at least one processor, cause the apparatus to perform at least the following:
      compile a subscriber-specific data structure comprising accounting information, wherein the accounting information includes a plurality of spectrum use records, each of the spectrum use records including an identification of a spectrum band; and
      transmit the data structure to a further apparatus.

18. An apparatus according to claim 17, wherein a spectrum use record includes an indication of at least one of a frequency, a bandwidth, a frequency channel number, a spectrum use offer, spectrum owner and an indication of extent of use.

19. An apparatus according to claim 18, wherein the indication of extent of use includes at least one of an indication of time duration of use, an indication of quantity of transferred data and a type of transferred data.

20. An apparatus according to claim 19, wherein the further apparatus includes an accounting server.

21. An apparatus, comprising at least one processor and memory storing computer-executable instructions, the computer-executable instructions, together with the processor, configured to cause the apparatus at least to:
   receive information describing a spectrum visit opportunity; and
   configure a radio transceiver of the apparatus to at least in part use the spectrum visit opportunity,
   wherein the information identifies a time interval when the visit opportunity is valid, wherein the information includes price information associated with the spectrum visit opportunity, wherein the price information includes at least one of different prices for different time instances and different prices for different types of data.

* * * * *